US010798271B2

(12) United States Patent
Parthasarathi et al.

(10) Patent No.: US 10,798,271 B2
(45) Date of Patent: Oct. 6, 2020

(54) DETECTING ERRORS IN THE TIMING BETWEEN SUBTITLES AND SHOT CHANGES

(71) Applicant: NETFLIX, INC., Los Gatos, CA (US)

(72) Inventors: Murthy Parthasarathi, San Jose, CA (US); Andrew Swan, San Jose, CA (US); Yadong Wang, Campbell, CA (US); Thomas E. Mack, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/863,772

(22) Filed: Jan. 5, 2018

(65) Prior Publication Data
US 2019/0215421 A1 Jul. 11, 2019

(51) Int. Cl.
*H04N 5/14* (2006.01)
*H04N 9/82* (2006.01)
*H04N 21/234* (2011.01)
*H04N 21/242* (2011.01)
*H04N 5/445* (2011.01)
*H04N 21/44* (2011.01)
*H04N 9/89* (2006.01)
(Continued)

(52) U.S. Cl.
CPC ......... *H04N 5/147* (2013.01); *H04N 5/44513* (2013.01); *H04N 9/8233* (2013.01); *H04N 9/89* (2013.01); *H04N 21/23418* (2013.01); *H04N 21/242* (2013.01); *H04N 21/4302* (2013.01); *H04N 21/44008* (2013.01); *H04N 21/4884* (2013.01); *H04N 2005/44526* (2013.01)

(58) Field of Classification Search
USPC .................................. 386/239–248, 278–290
See application file for complete search history.

(56) References Cited

U.S. PATENT DOCUMENTS

| 9,609,397 B1* | 3/2017 | Barreira Avegliano ..................... H04N 21/8547 |
| 2004/0093220 A1* | 5/2004 | Kirby ...................... G06F 17/27 704/278 |
| 2018/0211556 A1* | 7/2018 | Sreedhara ............... G09B 17/04 |

OTHER PUBLICATIONS

Kishore, "How to Add Your Own Subtitles to a Video," ttps://www.online-tech-tips.com/computer-tips/how-to-add-subtitles-to-a-video /, 15 pages, Nov. 2014.*
(Continued)

*Primary Examiner* — Hung Q Dang
(74) *Attorney, Agent, or Firm* — Artegis Law Group, LLP (57) ABSTRACT

In various embodiments, a subtitle timing application detects timing errors between subtitles and shot changes. In operation, the subtitle timing application determines that a temporal edge associated with a subtitle does not satisfy a timing guideline based on a shot change. The shot change occurs within a sequence of frames of an audiovisual program. The subtitle timing application then determines a new temporal edge that satisfies the timing guideline relative to the shot change. Subsequently, the subtitle timing application causes a modification to a temporal location of the subtitle within the sequence of frames based on the new temporal edge. Advantageously, the modification to the subtitle improves a quality of a viewing experience for a viewer. Notably, by automatically detecting timing errors, the subtitle timing application facilitates proper and efficient re-scheduling of subtitles that are not optimally timed with shot changes.

20 Claims, 4 Drawing Sheets

(51) Int. Cl.
    *H04N 21/43*     (2011.01)
    *H04N 21/488*     (2011.01)

(56) References Cited

OTHER PUBLICATIONS

Childress, "3 Ways to Subtitle and Caption Your Videos Automatically Using Artificial Intelligence," https://photography.tutsplus.com/tutorials/3-ways-to-subtitle-and-caption-your-videos-automatically-using-artificial-intelligence--cms-26834, 17 pages, Jul. 2016.*
Jadpraet, "A Guide to Timing in Aegisub," https://whynotsubs.com/A-guide-to-timing-in-Aegisubv2.pdf, 22 pages, Jun. 2011.*
Szarkowska et al., "Do shot changes really induce the re-reading of subtitles?" ICACS, Mar. 2015.*
Williams, "Online Subtitling Editorial Guidelines V1.1," http://www.bbc.co.uk/guidelines/futuremedia/accessibility/subtitling_guides/online_sub_editorial_guidelines_vs1_1.pdf, Jan. 2009.*
Kretz et al., "The Effects of Shot Changes on Eye Movements in Subtitling," Journal of Eye Movement Research, 13 pages, Dec. 2013.*
Park et al., "Exploiting Script-Subtitles Alignment to Scene Boundary Dectection in Movie," 2010 IEEE International Symposium on Multimedia, pp. 49-56, 2000.*
"BBC Subtitle Guidelines ," http://bbc.github.io/subtitle-guidelines/index_r1.html, BBC, 39 pages, Jan. 2016.*
"How to prepare subtitles for Netflix with EZTitles," http://www.eztitles.com/files/docs/How_to_create_subtitles_for_Netflix_with_EZTitles.pdf, Aug. 2017, 19 pages.*

* cited by examiner

DETECTING ERRORS IN THE TIMING BETWEEN SUBTITLES AND SHOT CHANGES

BACKGROUND OF THE INVENTION

Field of the Invention

Embodiments of the present invention relate generally to audiovisual processing and, more specifically, to detecting errors in the timing between subtitles and shot changes.

Description of the Related Art

Subtitles enable viewers who suffer from hearing loss or who do not understand the spoken dialog associated with an audiovisual program, such as a feature length film or a television program, to follow the spoken dialog. While the viewer is watching the video component of the audiovisual program on a display screen, the viewer also reads the subtitles displayed in a subtitle area of the display screen. To generate each subtitle, a professional subtitler typically defines, without limitation, text, a start timecode, and an end timecode. The text corresponds to a particular portion of the spoken dialog, while the start timecode and end timecode designate an interval of time during playback of the audiovisual program when the text is displayed.

In an attempt to optimize the quality of the viewing experience for the viewer, the subtitler attempts to synchronize the subtitle to the corresponding spoken dialog. However, because of the manner in which the mind and eyes of a viewer process data, the timing of the subtitle relative to shot changes can impact the quality of the viewing experience. In particular, empirical studies have shown that, when a subtitle appears less than twelve frames before a shot change, the viewer actually reads the subtitle twice—once when the subtitle appears and once when the shot change occurs. As a general matter, having to read a given subtitle multiple times diminishes the overall quality of the viewing experience. Empirical studies also have shown that, when a subtitle appears or disappears less than twelve frames from a shot change, a viewer can experience a flickering effect that also can diminish the overall quality of the viewing experience.

To address the above problems, some providers of audiovisual programs specify guidelines setting forth the appropriate timing between subtitles and shot changes. One limitation of these guidelines, however, is that generating and scheduling subtitles is primarily a manual process, and many audiovisual programs include thousands of shot changes and require subtitles in numerous languages. Consequently, manual attempts to ensure that each subtitle satisfies the timing requirements set forth in the guidelines can be error-prone and prohibitively time consuming. As a result, subtitles oftentimes are not properly timed with shot changes, and the overall quality of the viewing experience suffers accordingly.

As the foregoing illustrates, what is needed in the art are more effective techniques for ensuring proper timing between subtitles and shot changes.

SUMMARY OF THE INVENTION

One embodiment of the present invention sets forth a computer-implemented method for detecting timing errors between subtitles and shot changes. The method includes performing one or more operations, via a processor, to determine that a first temporal edge associated with a first subtitle does not satisfy a timing guideline relative to a first shot change that occurs within a sequence of frames of an audiovisual program; performing one or more additional operations, via the processor, to select a second temporal edge that satisfies the timing guideline relative to the first shot change; and causing a temporal location of the first subtitle within the sequence of frames to be modified based on the second temporal edge.

One advantage of the disclosed techniques is that automatically detecting errors in the timing between subtitles and shot changes facilitates modifying the subtitles to increase the overall quality of the viewing experience. In particular, specifying the timing error associated with a given subtitle facilitates efficient re-scheduling of the subtitle to eliminate unnecessary re-reading of the subtitle or perceived flickering caused by a shot change that is temporally proximate to the subtitle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques may be used to optimize the timing between subtitles and shot changes for an audiovisual program. For each subtitle, a subtitle timing application determines whether the timing of the subtitle satisfies guidelines for the timing between subtitles and shot changes. As part of determining whether a given subtitle satisfies the guidelines, the subtitle timing analyzer compares the timing of the subtitle to the timing of the shot changes. If the subtitle timing analyzer determines that the start or end of the subtitle does not satisfy the guidelines, then the subtitle timing analyzer determines a guidance edge that satisfies the guidelines.

For each incorrectly timed subtitle, the subtitle timing analyzer sets a timing error equal to the difference between the guidance edge and the incorrectly timed start or end of the subtitle. After processing all of the subtitles, the subtitle timing analyzer displays a subtitle graphical user interface that visually depicts the timing errors and the shot changes. Advantageous, unlike manual approaches to enforcing the guidelines, the subtitle timing application ensures that incorrectly timed subtitles are correctly identified in a non-prohibitive amount of time. Further, because the timing error specifies a length (e.g., time or number of frames) between the guidance edge and the incorrectly timed edge, the subtitle timing application facilitates a proper re-positioning of each subtitle that is incorrectly timed with the shot changes.

System Overview

Figure 1:
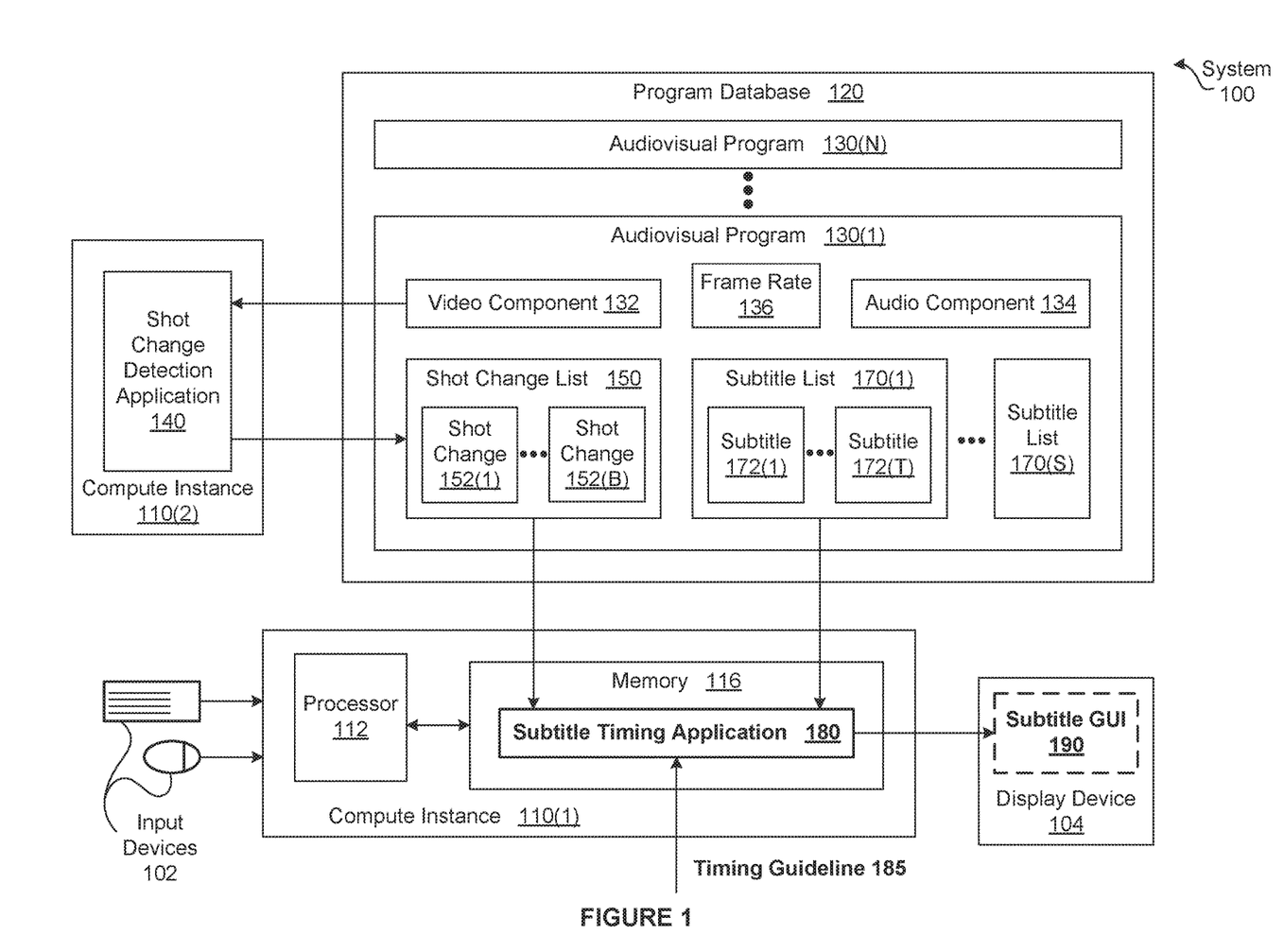
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a program database 120, a shot change detection application 140, compute instances 110, input devices 102, and a display device 104. For explanatory purposes, multiple instances of like objects are denoted with reference numbers identifying the object and parenthetical numbers identifying the instance where needed.

In various embodiments, the system 100 may include any number of program databases 120, any number of compute instances 110, any number of input devices 102 and any number of display devices 104. In the same or other embodiments, any number of the components of the system 100 may be distributed across multiple geographic locations or included in one or more cloud computing environments (i.e., encapsulated shared resources, software, data, etc.) in any combination.

As shown for the compute instance 110(1), each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The processor 112 may receive input via any number (including zero) of the input devices 102 and generate pixels for display on any number (including zero) of the display devices 104. The input devices 102 may include various types of input or input/output devices, such as a mouse, a keyboard, a microphone, a touch-based input device integrated with a display device 104 (i.e., a touch screen), and the like, for providing input data to the processor 112. The display device 104 may be any device capable of displaying images and/or video content. Such devices include, without limitation, a game console, a smartphone, a smart television (TV), a laptop 106, a tablet 107, and a desktop computer 108. In alternate embodiments, the system 100 may include any number and/or type of input devices 102, display devices 104, output devices, and/or input/output devices in any combination.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the system 100 are configured to implement one or more applications. More specifically, the compute instances 110 included in the system 100 perform operations involved in the generation and verification of audiovisual programs 130. Examples of audiovisual programs 130 include feature length files, episodes of television programs, and music videos, to name a few.

As shown, the program database 120 includes, without limitation, any number of the audiovisual programs 130. Each of the audiovisual programs 130 includes, without limitation, a visual component 132, a shot change list 150, a frame rate 136, an audio component 134, and any number of subtitle lists 170. The visual component 132 includes any number of different shot sequences (not shown), where each shot sequence includes a set of frames that usually have similar spatial-temporal properties and run for an uninterrupted period of time.

The frame at which one shot sequence ends and a different shot sequence begins is referred to herein as a shot change 152. As a general matter, each frame included in the visual component 132 is related to a particular time during the playback of the audiovisual program 130 via the frame rate 136. In some embodiments, the frame rate 136 specifies the number of frames that are displayed to the viewer per second and is also referred to as "frames per second." For instance, may audiovisual programs 130 are associated with a frame rate 136 of 24 frames per second. The shot change list 150 includes, without limitation, the shot changes 152 that occur during the playback of the audiovisual program 130.

The audio component 134 includes audio content (i.e., spoken dialog and other sounds) associated with the audiovisual program 130 and is typically synchronized to the video component 132. The subtitle lists 170 enable viewers who suffer from hearing loss or who do not understand the spoken dialog to follow the spoken dialog. Each of the subtitle lists 170 is associated with a different language and includes, without limitation, any number of subtitles 172 associated with the language. For example, the subtitle list 170(1) could include English subtitles 172, the subtitle list 170(2) could include French subtitles 172, the subtitle list 170(3) could include Hindi subtitles 172, etc.

While the viewer is watching the video component 132 of the audiovisual program 130 on a display screen, the viewer also reads the subtitles 170 displayed in a subtitle area of the display screen. To generate each of the subtitles 170, a professional subtitler typically generates, without limitation, text, a subtitle start, and a subtitle end (not shown in FIG. 1). The text corresponds to a particular portion of the spoken dialog, while the subtitle start and the subtitle end designate an interval of time during playback of the audiovisual program 130 when the text is displayed. The subtitle 172 may specify the subtitle start and the subtitle end in any technically feasible format. For instance, in some embodiments, the subtitle start is specified as a start timecode and the subtitle end is specified as an end timecode.

In an attempt to optimize the quality of the viewing experience for the viewer, the subtitler attempts to synchronize each of the subtitles 172 to the corresponding spoken dialog. However, because of the manner in which the mind and eyes of a viewer process data, the timing of each of the subtitles 172 relative to the shot changes 152 can impact the quality of the viewing experience. In particular, empirical studies have shown that, when the subtitle 172(x) appears less than twelve frames before the shot change 152(y), the viewer actually reads the subtitle 172(x) twice—once when the subtitle 172(x) appears and once when the shot change 152(y) occurs. As a general matter, having to read a given subtitle 152 multiple times diminishes the overall quality of the viewing experience. Empirical studies also have shown that, when the subtitle 172(x) appears or disappears less than twelve frames from the shot change 152(y), a viewer can experience a flickering effect that also can diminish the overall quality of the viewing experience.

To address the above problems, some providers of audiovisual programs 130 specify guidelines setting forth the appropriate timing between the subtitles 172 and the shot changes 152. One limitation of these guidelines, however, is that generating and scheduling the subtitles 172 is primarily a manual process, and many audiovisual programs 130 include thousands of the shot changes 152 and require the subtitles 172 in numerous languages. Consequently, manual attempts to ensure that each of the subtitles 172 satisfies the timing requirements set forth in the guidelines can be error-prone and prohibitively time consuming. As a result, the subtitles 172 oftentimes are not properly timed with the shot changes 152, and the overall quality of the viewing experience suffers accordingly.

Optimizing Timing of Subtitles to Shot Changes

To enable users to efficiently and properly modify the temporal positions of the subtitles 172 to satisfy guidelines for the timing between the subtitles 172 and the shot changes 152, the system 100 includes, without limitation, a shot change detection application 140 and a subtitle timing application 180. For explanatory purposes only, a "user" refers to any person that executes the subtitle timing application 180. One example of a user is a subtitler.

In operation, the shot change detection application 140 receives the video component 132 and performs any number of shot detection operations to generate the shot change list 150. The shot change detection application 150 then stores the shot change list 150 in the program database 120. As described in greater detail in conjunction with FIG. 2, the subtitle timing application 180 then acquires the shot change list 150, the subtitle list 170, and the timing guideline 185. More precisely, the subtitle timing application 180 retrieves the shot change list 150 and the subtitle list 170 from the program database 120 and receives the timing guideline 185 in any technically feasible fashion.

In alternate embodiments, the subtitle timing application 180 may acquire the shot change list 150, the subtitle list 170, and the timing guideline 185 in any technically feasible fashion. For instance, in some embodiments, the subtitle timing application 180 may receive the shot change list 150 directly from the shot change detection application 140. In other embodiments, the subtitle timing application 180 may execute one or more shot detection algorithms to generate the shot change list 150, and the system 100 may omit the shot change detection application 140. In various embodiments, the timing guideline 185 is not an input to the subtitle timing application 180. Instead the timing guideline 185 is integrated into the functionality of the subtitle timing application 180.

The timing guideline 185 specifies one or more rules for the timing between the subtitles 172 and the shot changes 152. More specifically, the timing guideline 185 specifies a minimum frame gap (e.g., 12 frames) or a minimum time gap (e.g., 0.5 seconds) between each shot change 152 and each temporal edge of each subtitle 172 when the temporal edge of the subtitle 172 is not coincident with the shot change 152. As referred to herein, a temporal interval is a time interval or a frame interval, and is associated with two "temporal edges," one temporal edge at the start of the temporal interval and another temporal edge at the end of the temporal interval. Accordingly, the subtitle start of the subtitle 172 and the subtitle end of the subtitle 172 are the temporal edges of the subtitle 172.

As shown, the subtitle timing application 180 resides in the memory 116 of the computer instance 110(1) and executes on the processor 112 of the compute instance 110(1). For each of the subtitles 172 included in the subtitle list 170, the subtitle timing application 180 analyzes the subtitle 172 in conjunction with the shot changes 152 included in the shot change list 150 to determine whether the subtitle 172 satisfies the timing guideline 185. As part of determining whether the subtitle 172 satisfies the timing guideline 185, the subtitle timing application 180 analyzes at least one of the temporal edges of the subtitle 172. If both of the temporal edges of the subtitle 172(x) satisfy the timing guideline 185, then the subtitle timing application 180 determines that the subtitle 172 satisfies the timing guideline 185.

If, however, a temporal edge of the subtitle 172(x) does not satisfy the timing guideline 185, then the subtitle timing application 180 determines a guidance edge. The guidance edge specifies a new position for the temporal edge that satisfies the timing guideline 185. The subtitle timing application 180 then subtracts the frame associated with the temporal edge from the frame associated with the guidance edge to determine a timing error associated with the temporal edge.

In alternate embodiments, in addition to or instead of the timing guideline 185 that specifies a minimum gap between temporal edges of the subtitles 172 and the shot changes 152, the subtitle timing application 180 may acquire and apply any number and type of timing guidelines 185 in any technically feasible fashion. For instance, in some embodiments, the subtitle timing application 185 may acquire the timing guideline 185(x) that specifies a minimum gap (e.g., 2 frames) between sequential subtitles 152. The subtitle timing application 185 may then perform comparison operations between the subtitles 152 to identify any violations of the timing guideline 185(x).

In the same or other embodiments, the subtitle timing application 185 may acquire the timing guideline 185(y) that specifies a maximum reading speed. For each subtitle 172, the subtitle timing application 185 may divide the number of characters included in the text of the subtitle 172 by the amount of time the subtitle is on the screen (subtitle end–subtitle start) to compute a reading speed. If the reading speed of the subtitle 172 exceeds the maximum reading speed, then the subtitle timing application 185 may identify an error associated with the timing guideline 185(y) and the subtitle 172.

Subsequently, the subtitle timing application 180 generates a subtitle graphical user interface (GUI) 190 depicting a timeline that includes, without limitation, any number and combination of the shot changes 152, the subtitles 172, the guidance edges, and the timing errors. The subtitle GUI 190 may provides any number and type of visual components (e.g., interface widgets, search widgets, panels, tabs, etc.) that enable the user to quickly and efficiently select and re-position subtitles 172 having timing errors via the input devices 102.

In alternate embodiments, the subtitle GUI 190 may enable the user to playback portions of the video component 132 or the audio component 134. In the same or other embodiments, the subtitle GUI 190 may depict a waveform associated with the audio component 132 in the timeline. In some embodiments, the subtitle timing application 180 may output error messages in any technically feasible fashion instead of or in addition to generating the subtitle GUI 190. For example, the subtitle timing application 180 could generate text messages or verbal messages specifying the timing errors instead of generating the subtitle GUI 190.

It will be appreciated that the system 100 shown herein is illustrative and that variations and modifications are possible. For example, the functionality provided by the subtitle timing application 180 and the shot change detection application 140 as described herein may be integrated into or distributed across any number of software applications (including one) and any number of components of the system 100. Further, the connection topology between the various units in the system 100 may be modified as desired.

Note that the techniques described herein are illustrative rather than restrictive, and may be altered without departing from the broader spirit and scope of the invention. For instance, in some embodiments, many modifications and variations will be apparent to those of ordinary skill in the art without departing from the scope and spirit of the described embodiments and techniques. As a general matter, the techniques outlined herein are applicable to automatically detecting any number and type of errors in the timing of the subtitles 172 based on the shot changes 152.

Detecting Subtitles that Violate Timing Guidelines

Figure 2:
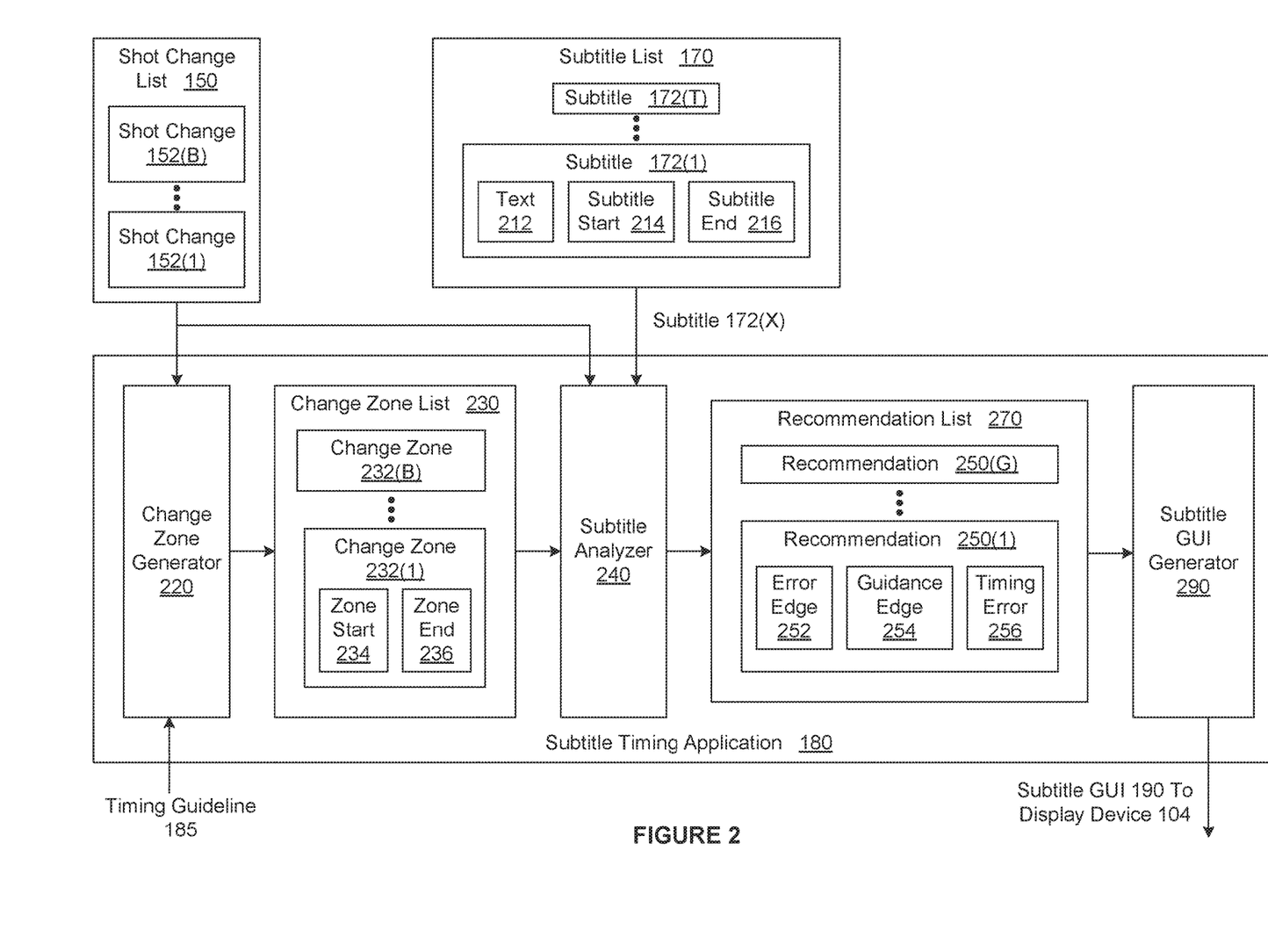
FIG. 2 is a more detailed illustration of the subtitle timing application of FIG. 1, according to various embodiments of the present invention.

FIG. 2 is a more detailed illustration of the subtitle timing application 180 of FIG. 1, according to various embodiments of the present invention. As shown, the subtitle timing application 180 includes, without limitation, a change zone generator 220, a change zone list 230, a subtitle analyzer 250, a recommendation list 270, and a subtitle graphical user interface (GUI) generator 290. In general, the subtitle timing application 180 acquires the shot change list 150, the timing guideline 185, and the subtitle list 170, generates the subtitle GUI 190, and causes the display device 104 to display the subtitle GUI 190.

As shown, each of the subtitles 172 included in the subtitle list 170 include, without limitation, text 212, a subtitle start 214 and a subtitle end 216. The text 212 corresponds to a particular portion of the spoken dialog of the audio component 134 of the audiovisual program 130. The subtitle start 214 and the subtitle end 216 indicate a temporal interval during a playback of the audiovisual program 130 over which the text is displayed. More precisely, the subtitle start 214 specifies a time or frame during the playback at which the text 212 begins to be displayed to the viewer. By contrast, the subtitle end 216 specifies a time or frame during the playback at which the text 212 ceases to be displayed to the viewer. The subtitle start 214 and the subtitle end 216 may be specified in any technically feasible format. For instance, in some embodiments, the subtitle start 214 is specified as a start timecode and the subtitle end 216 is specified as an end timecode.

As shown, the change zone generator 220 acquires the shot change list 150 and the timing guideline 185. The change zone generator 220 may acquire the shot change list 150 in any technically feasible fashion. For example, the change zone generator 220 could retrieve the shot change list 150 from the program database 120, receive the shot change list 150 from the shot change detection application 140, or generate the shot change list 150.

The timing guideline 185 specifies a minimum frame gap or a minimum time gap between each shot change 152 and each temporal edge of each subtitle 172 when the temporal edge of the subtitle 172 is not coincident with the shot change 152. The change zone generator 220 may acquire the timing guideline 185 in any technically feasible fashion. For instance, in some embodiments, the change zone generator 220 may receive a value (e.g., 12 frames or 0.5 seconds) for the minimum frame gap or the minimum time gap via the subtitle GUI 190. In alternate embodiments, the change zone generator 220 is configured to implement a predetermined minimum frame gap or a predetermined minimum time gap.

The change zone generator 220 generates the change zone list 230 based on the shot change list 150 and the timing guideline 185. As shown, the change zone list 230 includes, without limitation, one or more change zones 232. The number of change zones 232 included in the change zone list 230 is equal to the number of shot changes 152 included in the shot change list 150. Each of the change zones 232 specifies an temporal interval and includes, without limitation, a zone start 234 and a zone end 236. As described previously herein in conjunction with FIG. 1, a temporal interval is a time interval or a frame interval, and is associated with two "temporal edges," one temporal edge at the start of the temporal interval and another temporal edge at the end of the temporal interval. Accordingly, the zone start 234 and the zone end 236 of the change zone 232 are the temporal edges of the change zone 232.

For each of the shot changes 152 included in the shot change list 150, the change zone generator 220 generates the corresponding change zone 232 based on shot change 152 and the timing guideline 185. More precisely, for the shot change 152(x), the change zone generator 220 generates the change zone 232 that spans from (shot change 152(x)−minimum frame/time gap) to (shot change 152(x)+minimum frame/time gap). Consequently, if the minimum frame gap is 12, then each of the change zones 232 spans 24 frames. Notably, based on the timing guideline 185, any temporal edge of any of the subtitles 172 that lies within a particular change zone 232 is required to be coincident with the shot change 152 associated with the change zone 232 or one of the temporal edges of the change zone 232.

For explanatory purposes only, the subtitle timing application 180, the change zone generator 220, the subtitle analyzer 240, and the subtitle GUI generator 290 are described as performing operations based on a temporal metric of frames. However, as persons skilled in the art will recognize, each of the subtitle timing application 180, the change zone generator 220, the subtitle analyzer 240, and the subtitle GUI generator 290 may convert values for times to values for frames and vice versa based on the frame rate 136. For example, if the timing guideline 185 specified a minimum time gap of 0.5 seconds and the frame rate 136 was 24 frames per second, then the change zone generator 220 would compute the minimum frame gap of 12 frames.

The subtitle analyzer 240 receives the change zone list 230 from the change zone generator 220, acquires the shot change list 150, acquires the subtitle list 170 and generates the recommendation list 270. The subtitle analyzer 240 may acquire the shot change list 150 and the subtitle list 170 in any technically feasible fashion. For instance, in some embodiments, the subtitle analyzer 240 may receive the shot change list 150 from the change zone generator 220 or the subtitle timing application 180. In the same or other embodiments, the subtitle analyzer 240 may retrieve the subtitle list 170 from the program database 120.

As shown, the subtitle analyzer 240 analyzes each of the subtitles 172(x) included in the subtitle list 170 independently with respect to the timing guideline 185. In operation, for the subtitle 172(x), the subtitle analyzer 240 first determines whether the subtitle start 214(x) is coincident with one of the shot changes 152 included in the shot change list 150, coincident with one of the temporal edges of one of the change zones 232, or lies outside all of the change zones 232. In general, as part of comparing the subtitle start 214(x) to the shot changes 152 and the temporal edges of the change zones 232, the subtitle analyzer 240 may perform any number of conversions between times and frames based on the frame rate 136.

If the subtitle start 214(x) is coincident with one of the shot changes 152, coincident with one of the temporal edges of one of the change zones 232, or lies outside all of the change zones 232, then the subtitle analyzer 240 determines that the subtitle start 214(x) satisfies the timing guideline 185. Otherwise, the subtitle analyzer 240 determines that the subtitle start 214(x) does not satisfy the timing guideline 185.

If the subtitle analyzer 240 determines that the subtitle start 214(x) does not satisfy the timing guideline 185, then the subtitle analyzer 240 generates a recommendation 250 that describes the violation of the subtitle start 214(x) and recommends a specific corrective action. The recommendation 250 includes, without limitation, an error edge 252, a guidance edge 254, and a timing error 256. In general, the error edge 252 specifies the temporal edge of the associated subtitle 172 that violates the timing guideline 185. The guidance edge 254 specifies the closest location to the error edge 252 that satisfies the timing guideline 185. The error edge 256 specifies a difference between the guidance edge 254 and the error edge 252 and, consequently, indicates the magnitude of the timing violation associated with the error edge 252.

Because the subtitle start 214(x) violates the timing guideline 185, the subtitle analyzer 240 sets the error edge 252 equal to the subtitle start 214(x). To determine the guidance edge 254, the subtitle analyzer 240 identifies the change zone 232(y) that surrounds the error edge 252. The change zone 232(y) spans from the zone start 234(y) to the zone end 236(y) and is associated with the shot change 152(y) that lies within the change zone 232(y). Subsequently, the subtitle analyzer 240 determines which of the zone start 234(y), the zone end 236(y), and the shot change 152(y) is the closest edge to the error edge 252. Finally, the subtitle analyzer 240 sets the guidance edge 254 equal to the closest edge.

The subtitle analyzer 240 subtracts the frame associated with the guidance edge 254 from the frame associated with the error edge 252 to compute the timing error 256. In alternate embodiments, the subtitle analyzer 240 may determine and specify the timing error 256 in any technically feasible fashion. Examples of formats for the timing error 256 include, without limitation, a signed number of frames, an unsigned number of frames, a signed amount of time, and an unsigned amount of time. For instance, in some embodiments, the subtitle analyzer 240 could subtract the time associated with the guidance edge 254 from the time associated with the error edge 252 to determine a singed timing error and then set the timing error 256 equal to the absolute value of the signed timing error.

The subtitle analyzer 240 then appends the newly generated recommendation 250 to the recommendation list 270. The recommendation list 270 includes, without limitation, any number of recommendations 250, where each recommendation 250 is associated with a different subtitle 172 that violates the timing guideline 185. As persons skilled in the art will recognize, because the length of the temporal interval during which a given subtitle 172 is displayed exceeds the length of the temporal interval associated with the change zones 232, at most one of the temporal edges of the subtitle 172 violates the timing guideline 185. Consequently, if the subtitle analyzer 240 determines that the subtitle start 214(x) violates the timing guideline 185, then the subtitle analyzer 240 proceeds to analyze the next subtitle 172(x+1) without analyzing the subtitle end 216(x).

If the subtitle analyzer 240 determines that the subtitle start 214(x) does not violate the timing guideline 185, then the subtitle analyzer determines whether the subtitle end 216(x) violates the timing guideline 185. More precisely, the subtitle analyzer 240 determines whether the subtitle end 216(x) is coincident with one of the shot changes 152 included in the shot change list 150, coincident with one of the temporal edges of one of the change zones 232, or lies outside all of the change zones 232. In general, as part of comparing the subtitle end 216(x) to the shot changes 152 and the temporal edges of the change zones 232, the subtitle analyzer 240 may perform any number of conversions between times and frames based on the frame rate 136.

If the subtitle end 216(x) is coincident with one of the shot changes 152, coincident with one of the temporal edges of one of the change zones 232, or lies outside all of the change zones 232, then the subtitle analyzer 240 determines that the subtitle end 216(x) satisfies the timing guideline 185. Because the subtitle analyzer 240 has already determined that the subtitle start 214(x) satisfies the timing guideline 185, the subtitle analyzer 240 determines that the subtitle 172 satisfies the timing guideline 185 and proceeds to analyze the next subtitle 172(x+1).

Otherwise, the subtitle analyzer 240 determines that the subtitle end 216(x) does not satisfy the timing guideline 185 and generates a new recommendation 250. The recommendation 250 describes the violation of the subtitle end 216(x) and recommends a specific corrective action. Because the subtitle end 216(x) violates the timing guideline 185, the subtitle analyzer 240 sets the error edge 252 equal to the subtitle end 216(x). The subtitle analyzer 250 then determines the guidance edge 254 and the timing error 256 based on the error edge 252 as described above in conjunction with the subtitle start 214(x). Finally, the subtitle analyzer 240 appends the new recommendation 250 to the recommendation list 270 and proceeds to analyze the next subtitle 172(x+1).

In alternate embodiments, the subtitle analyzer 240 may perform comparisons directly between the shot changes 152 and the subtitles 172 to determine whether each of the subtitles 172 satisfies the timing guideline 185. In such embodiments, the subtitle timing application 180 does not generate the change zone list 230. Accordingly, the change zone generator 220 is omitted from the subtitle timing application 180.

After the subtitle analyzer 240 has analyzed all of the subtitles 172 included in the subtitle list 170, the subtitle GUI generator 290 receives the recommendation list 270, generates the subtitle GUI 190, and causes the subtitle GUI 190 to be displayed to the user via the display device 104. The subtitle graphical user interface (GUI) 190 depicts, without limitation, any number and combination of timelines, the shot changes 152, the subtitles 172, the error edges 252, the guidance edges 254, and the timing errors 256. The subtitle GUI 190 may provides any number and type of visual components (e.g., interface widgets, search widgets, panels, tabs, etc.) that enable the user to quickly and efficiently select and re-position the subtitles 172 associated with the timing errors 256 via the input devices 102.

In alternate embodiments, the subtitle timing application 180 may facilitate the proper timing of the subtitles 152 with the shot changes 172 in any technically feasible fashion. For instance, in some embodiments, the subtitle GUI 190 may also include, without limitation, a display pane that displays at least a portion of the video component 132 and a timeline reflecting at least a portion of the audio component 134. In the same or other embodiments, the subtitle GUI 190 may enable the user to playback portions of the video component 132 or the audio component 134. In some alternate embodiments, the subtitle GUI 190 may depict a waveform associated with the audio component 132.

In various embodiments, the subtitle timing application 180 may output error messages in any technically feasible fashion instead of or in addition to generating the subtitle GUI 190. For example, the subtitle timing application 180 could generate text messages specifying the timing errors 256 instead of generating the subtitle GUI 190. In such embodiments, the subtitle timing application 180 may omit the subtitle GUI generator 290.

It will be appreciated that the subtitle timing application 180 shown herein is illustrative and that variations and modifications are possible. For example the functionality provided by the subtitle timing application 180, the change zone generator 220, the subtitle analyzer 240, and the subtitle GUI generator 290 as described herein may be integrated into or distributed across any number of software applications (including one) and any number of components of the system 100.

Note that the techniques described herein are illustrative rather than restrictive, and may be altered without departing from the broader spirit and scope of the invention. For instance, in some embodiments, many modifications and variations will be apparent to those of ordinary skill in the art without departing from the scope and spirit of the described embodiments and techniques. As a general matter, the techniques outlined herein are applicable to automatically detecting any number and type of errors in the timing of the subtitles 172 based on the shot changes 152.

For instance, in some alternate embodiments, the timing guideline 185 specifies different rules for the subtitle starts 214 and the subtitle ends 216. The timing guideline 185 specifies a start minimum frame gap between each shot change 152 and each subtitle start 214 of each subtitle 172 when the subtitle start 214 is not coincident with the shot change 152. In addition, the timing guideline 185 specifies an end minimum frame gap between each shot change 152 and each subtitle end 216 of each subtitle 172 when the subtitle end 216 is not coincident with the shot change 152.

In such embodiments, for each of the shot changes 152 included in the shot change list 150, the change zone generator 220 generates a start change zone and an end change zone instead of the single change zone 232. The start change zone reflects the start minimum frame gap, while the second change zone reflects the end frame gap. Subsequently, for each subtitle 172(*x*), the subtitle analyzer 240 analyzes the subtitle start 214(*x*) with respect to the start change zones and the subtitle end 216(*x*) with respect to the end change zones.

Figure 3:
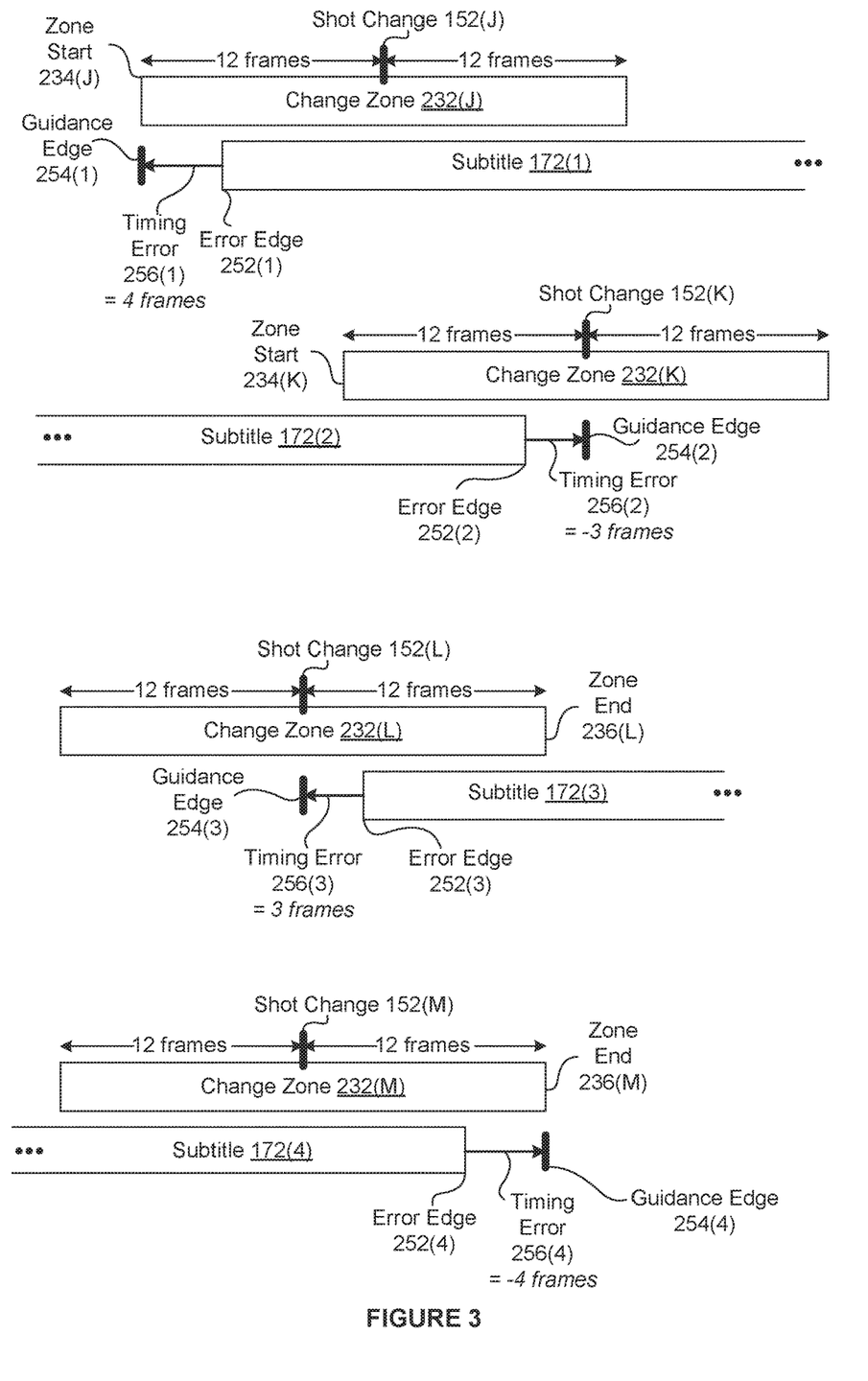
FIG. 3 illustrates different examples of different subtitle timing errors that can be identified by the subtitle timing application of FIG. 1, according to various embodiments of the present invention.

FIG. 3 illustrates different examples of different subtitle timing errors that can be identified by the subtitle timing application 180 of Figure, according to various embodiments of the present invention. For explanatory purposes only, the timing guideline 185 specifies that, for each temporal edge of each of the subtitles 172 that is not coincident with one of the shot changes 152, the gap between the temporal edge and the shot change 152 is to be no less than 12 frames. FIG. 3 depicts four different subtitles 172(1)-172(4) that violate the timing guideline 185.

For each of four shot changes 152, the change zone generator 220 of FIG. 2 generates the corresponding change zone 232. Accordingly, as shown, each of the change zones 232 spans 24 frames. In general, because the length of the temporal interval during which a given subtitle 172 is displayed exceeds the length of the temporal interval associated with the change zones 232, at most one of the temporal edges of the subtitle 172 violates the timing guideline 185.

As shown, the subtitle start 214(1) of the subtitle 172(1) lies after the zone start 234(J) of the change zone 232(J) and before the shot change 152(J) associated with the change zone 232(J). Accordingly, the subtitle analyzer 240 generates the recommendation 250(1) and sets the error edge 252(1) equal to the subtitle start 214(1). Because the distance between the error edge 252(1) and the zone start 234(J) is less than the distance between the error edge 252(1) and shot change 152(J), the subtitle analyzer 240 sets the guidance edge 254(1) equal to the zone start 234(J). Finally, the subtitle analyzer 240 subtracts the frame associated with the guidance edge 254(1) from the frame associated with the error edge 252(1) to compute the timing error 256(1) of 4 frames.

The subtitle end 216(2) of the subtitle 172(2) lies after the zone start 234(K) of the change zone 232(K) and before the shot change 152(K) associated with the change zone 232(K). Accordingly, the subtitle analyzer 240 generates the recommendation 250(2) and sets the error edge 252(2) equal to the subtitle end 216(2). Because the distance between the error edge 252(2) and the zone start 234(K) is greater than the distance between the error edge 252(2) and shot change 152(K), the subtitle analyzer 240 sets the guidance edge 254(2) equal to the shot change 152(K). Finally, the subtitle analyzer 240 subtracts the frame associated with the guidance edge 254(2) from the frame associated with the error edge 252(2) to compute the timing error 256(2) of −3 frames.

The subtitle start 214(3) of the subtitle 172(3) lies after the shot change 152(L) associated with the change zone 232(L) and before the zone end 236(L) of the change zone 232(L). Accordingly, the subtitle analyzer 240 generates the recommendation 250(3) and sets the error edge 252(3) equal to the subtitle start 214(3). Because the distance between the error edge 252(3) and the zone end 236(L) is greater than the distance between the error edge 252(3) and shot change 152(L), the subtitle analyzer 240 sets the guidance edge 254(3) equal to the shot change 152(L). Finally, the subtitle analyzer 240 subtracts the frame associated with the guidance edge 254(3) from the frame associated with the error edge 252(3) to compute the timing error 256(3) of 3 frames.

The subtitle end 216(4) of the subtitle 172(4) lies after the shot change 152(M) associated with the change zone 232(M) and before the zone end 236(M) of the change zone 232(M). Accordingly, the subtitle analyzer 240 generates the recommendation 250(4) and sets the error edge 252(4) equal to the subtitle end 216(4). Because the distance between the error edge 252(4) and the zone end 236(M) is less than the distance between the error edge 252(4) and shot change 152(M), the subtitle analyzer 240 sets the guidance edge 254(4) equal to the zone end 236(M). Finally, the subtitle analyzer 240 subtracts the frame associated with the guidance edge 254(4) from the frame associated with the error edge 252(3) to compute the timing error 256(4) of −4 frames.

Figure 4:
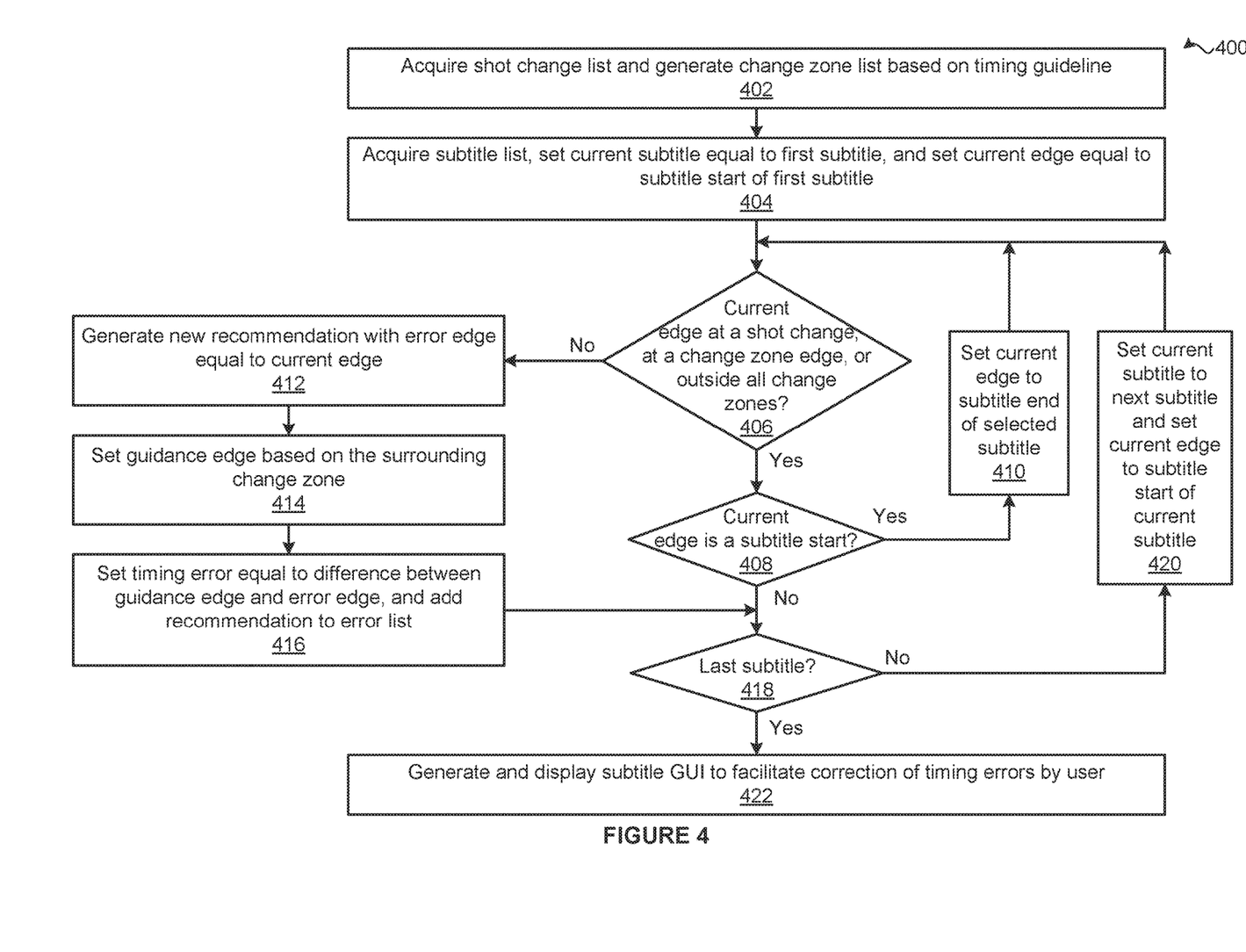
FIG. 4 is a flow diagram of method steps for detecting timing errors between subtitles and shot changes, according to various embodiments of the present invention.

FIG. 4 is a flow diagram of method steps for detecting timing errors between subtitles and shot changes, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the subtitle timing application 180 acquires the shot change list 150, and the change zone generator 220 generates the change zone list 230 based on the shot change list 150 and the timing guideline 185. The shot change list 150 may include any number of shot changes 152 that are associated with the audiovisual program 130. The subtitle timing application 180 may acquire the shot change list 150 in any technically feasible fashion.

For instance, in some embodiments, the subtitle timing application 180 may generate the shot change list 150 based on the video component 132 of the audiovisual program 130 using any number and type of shot detection algorithms. In other embodiments, the subtitle timing application 180 may receive the shot change list 150 from the shot change detection application 140. In yet other embodiments, the subtitle timing application 180 may read the shot change list 150 from the program database 120.

The timing guideline 185 specifies a minimum frame gap between each shot change 152 and each temporal edge of each subtitle 172 when the temporal edge of the subtitle 172 is not coincident with the shot change 152. For each shot change 152, the change zone generator 220 generates the associated change zone 232. Each of the change zones 232 represents an interval of time surrounding the associated shot change 152 that spans from the (shot change 152−the minimum frame gap) to the (shot change 152+the minimum frame gap). In alternate embodiments, the timing guideline 185 specifies a minimum time gap instead of a minimum frame gap, and the change zone generator 220 converts the minimum time gap to the minimum frame gap based on the frame rate 136.

At step 404, the subtitle timing application 180 acquires the subtitle list 170, sets a current subtitle 172 equal to the first subtitle 172 included in the subtitle list 172, and sets a current edge equal to the subtitle start 214 of the first subtitle 172. The subtitle list 170 may include any number of subtitles 172 that are associated with the audiovisual program 130. The subtitle timing application 180 may acquire the subtitle list 170 in any technically feasible fashion. For instance, in some embodiments, the subtitle timing application 180 may read the subtitle list 170 from the program database 120.

At step 406, the subtitle analyzer 240 determines whether the current edge is coincident with one of the shot changes 152, coincident with one of the temporal edges of one of the change zones 232, or lies outside all of the change zones 232. Notably, based on the timing guideline 185, any temporal edge of any of the subtitles 172 that lies within a particular change zone 232 is required to be coincident with the shot change 152 associated with the change zone 232 or one of the temporal edges of the change zone 232. Consequently, if the current edge is coincident with one of the shot changes 152, coincident with one of the temporal edges of one of the change zones 232, or lies outside all of the change zones 232, then the subtitle analyzer 240 determines that the current edge satisfies the timing guideline 185.

In some embodiments, at step 406, the subtitle analyzer 240 may perform comparisons directly between the shot changes 152 and the subtitles 172 to determine whether each of the subtitles 172 satisfies the timing guideline 185. In such embodiments, at step 402, the subtitle timing application 180 acquires the shot change list 150, but does not generate the change zone list 230. Accordingly, the change zone generator 220 is omitted from the subtitle timing application 180.

If, at step 406, the subtitle analyzer 240 determines that the current edge is coincident with one of the shot changes 152, coincident with one of the temporal edges of one of the change zones 232, or lies outside all of the change zones 232, then the method 400 proceeds to step 408. At step 408, the subtitle timing application 180 determines whether the current edge is the subtitle start 214 of the current subtitle 172. If, at step 408, the subtitle timing application 180 determines that the current edge is the subtitle start 214 of the current subtitle 172, then the method 400 proceeds to step 410. At step 410, the subtitle timing application 180 sets the current edge equal to the subtitle end 216 of the current subtitle 172. The method 400 then returns to step 406, where the subtitle analyzer 240 determines whether current edge is properly timed with the shot changes 152.

If, however, at step 406, the subtitle analyzer 240 determines that the current edge lies within one of the change zones 232, is not coincident with the shot change 152 associated with the change zone 232, and is not coincident with one of the temporal edges of the change zone 232, then the method 400 proceeds directly to step 412. At step 412, the subtitle analyzer 240 generates a new recommendation 250 and sets the error edge 252 equal to the current edge.

At step 414, the subtitle analyzer 240 sets the guidance edge 254 included in the recommendation 250 based on the change zone 232 surrounding the error edge 252. More specifically, the subtitle analyzer 240 determines which of the zone start 234 of the "surrounding" change zone 232, the zone end 234 of the surrounding change zone 232, and the shot change 152 associated with the surrounding change zone 232 is the closest edge to the error edge 252. The subtitle analyzer 240 then sets the guidance edge 254 equal to closest edge to the error edge 252. At step 416, the subtitle analyzer 240 sets the timing error 256 included in the recommendation 250 equal to the difference between the guidance edge 254 and the error edge 252 and appends the recommendation 250 to the recommendation list 250.

Returning now to step 408, if the subtitle timing application 180 determines that the current edge is not the subtitle start 214 of the current subtitle 172, then the method 400 proceeds directly to step 418. At step 418, the subtitle timing application 180 determines whether the current subtitle 172 is the last subtitle 172 included in the subtitle list 270. If, at step 418, the subtitle timing application 180 determines that the current subtitle 172 is not the last subtitle 172 included in the subtitle list 270, then the method 400 proceeds to step 420. At step 420, the subtitle timing application 180 sets the current subtitle 172 equal to the next subtitle 172 included in the subtitle list 270 and sets the current edge equal to the subtitle start 214 of the current subtitle 172. The method 400 then returns to step 406, where the subtitle analyzer 240 determines whether the current edge is properly timed with the shot changes 152.

If, however, at step 418, the subtitle timing application 180 determines that the current subtitle 172 is the last subtitle 172 included in the subtitle list 270, then the method 400 proceeds directly to step 422. At step 422, the subtitle GUI generator 290 generates the subtitle GUI 190 and causes the subtitle GUI 190 to be displayed to the user. The subtitle GUI 190 includes, without limitation, one or more of the shot changes 172, the change zones 232, the subtitles 152, the error edges 252, the guidance edges 254, and the timing errors 256. Subsequently, the user adjusts the temporal locations of the subtitles 172 to correct the timing errors 256. In this fashion, the subtitles 172 are properly timed with the shot changes 152.

In alternate embodiments, the subtitle timing application 180 may facilitate the proper timing of the subtitles 172 with the shot changes 152 in any technically feasible fashion. For instance, in some embodiments, the subtitle GUI 190 may also include, without limitation, a display pane that displays at least a portion of the video component 132 and a timeline reflecting at least a portion of the audio component 134. In other embodiments, for each of the recommendations 250, the subtitle timing application 180 may output an error message specifying the subtitle 172 associated with the recommendation 250 and the timing error 256.

In sum, the disclosed techniques may be used to guide the timing of subtitles with shot changes for an audiovisual program. A subtitle timing application includes, without limitation, a change zone generator, a subtitle analyzer, and a subtitle graphical user interface (GUI) generator. Initially, for each shot change included in the audiovisual program, the change zone generator determines a change zone that spans from twelve frames before the shot change to twelve frames after the shot change. Subsequently, for each subtitle, the subtitle analyzer determines whether either of the temporal edges (i.e., subtitle start and subtitle end) of the subtitle is associated with a timing error based on the change zones.

More precisely, for a given temporal edge, if the temporal edge is coincident with a shot change, is coincident with an edge of a change zone, or lies outside all the change zones, then the subtitle analyzer determines that the temporal edge is not associated with a timing error. Otherwise, the subtitle analyzer determines that the temporal edge is associated with a timing error. The subtitle analyzer sets an associated guidance edge to the closer of the closest edge of the enclosing change zone and the shot change associated with the change zone. The subtitle analyzer then sets an associated timing error equal to the difference between the temporal edge and the associated guidance edge. After processing all of the subtitles, the subtitle GUI generator displays a subtitle GUI that visually depicts, without limitation, any number of the subtitles, the shot changes, the guidance edges, and the timing errors.

Advantageously, the subtitle timing application provides feedback that enables the user to efficiently adjust subtitles to satisfy the guidelines for timing between subtitles and shot changes designed to optimize the viewing experience for the viewer. Unlike manual approaches to enforcing the guidelines, because the subtitle timing application automatically and accurately computes any timing errors, the subtitle timing application ensures that incorrectly timed subtitles are correctly identified in a non-prohibitive amount of time. Further, by specifying the guidance edge, the subtitle timing application prompts the user to properly re-position each incorrectly timed subtitle in order to optimize the viewing experience for the viewer.

1. In some embodiments, a computer-implemented method comprises performing one or more operations, via a processor, to determine that a first temporal edge associated with a first subtitle does not satisfy a timing guideline relative to a first shot change that occurs within a sequence of frames of an audiovisual program; performing one or more additional operations, via the processor, to select a second temporal edge that satisfies the timing guideline relative to the first shot change; and causing a temporal location of the first subtitle within the sequence of frames to be modified based on the second temporal edge.

2. The computer-implemented method of clause 1, wherein the first temporal edge associated with the first subtitle comprises either the start of the first subtitle or the end of the first subtitle.

3. The computer-implemented method of clauses 1 or 2, wherein performing the one or more operations to determine that the first temporal edge associated with the first subtitle does not satisfy the timing guideline comprises: generating a first zone based on a frame included in the sequence of frames and associated with the first shot change and a minimum gap specified by the first timing guideline; determining that the first temporal edge lies inside the first zone; and determining that the first temporal edge is not coincident with either the first shot change, the start of the first zone, or the end of the first zone.

4. The computer-implemented method of any of clauses 1-3, wherein performing the one or more additional operations to select the second temporal edge comprises computing a first distance between the first temporal edge and the start of the first zone; computing a second distance between the first temporal edge and the end of the first zone; computing a third distance between the first temporal edge and the first shot change; and if the first distance is smaller than the second distance and the first distance is smaller than the third distance, then setting the second temporal edge equal to the start of the first zone; or if the second distance is smaller than the third distance, then setting the second temporal edge equal to the end of the first zone; or setting the second temporal edge equal to the first shot change.

5. The computer-implemented method of any of clauses 1-4, wherein causing the temporal location of the first subtitle within the sequence of frames to be modified comprises generating a graphical user interface that depicts the first shot change, the first subtitle, and the second temporal edge.

6. The computer-implemented method of any of clauses 1-5, wherein causing the temporal location of the first subtitle within the sequence of frames to be modified comprises computing a timing error based on the first temporal edge and the second temporal edge; and generating an error message that specifies the first subtitle and the timing error.

7. The computer-implemented method of any of clauses 1-6, wherein the timing guideline specifies at least one of a minimum frame gap and a minimum time gap between a shot change and the start of a subtitle when the start of the subtitle is not coincident with the shot change.

8. The computer-implemented method of any of clauses 1-7, further comprising performing one or more operations on the audiovisual program to identify one or more shot changes that include the first shot change.

9. The computer-implemented method of any of clauses 1-8, further comprising computing a reading speed associated with the first subtitle based on a frame rate; determining that the reading speed associated with the first subtitle exceeds a maximum reading speed; and generating an error message specifying the first subtitle and the reading speed.

10. In some embodiments, a computer-readable storage medium includes instructions that, when executed by a processor, cause the processor to perform the steps of acquiring a plurality of shot changes associated with an audiovisual program; performing one or more operations to determine that a first temporal edge associated with a first subtitle does not satisfy a timing guideline relative to a first shot change that occurs within a sequence of frames of the audiovisual program and is included in the plurality of shot changes; performing one or more additional operations to select a second temporal edge that satisfies the timing guideline relative to the first shot change; and causing a temporal location of the first subtitle within the sequence of frames to be modified based on the second temporal edge.

11. The computer-readable storage medium of clause 10, wherein the first temporal edge associated with the first subtitle comprises either the start of the first subtitle or the end of the first subtitle.

12. The computer-readable storage medium of clauses 10 or 11, wherein performing the one or more operations to determine that the first temporal edge associated with the first subtitle does not satisfy the timing guideline comprises generating a first zone based on a frame included in the sequence of frames and associated with the first shot change and a minimum gap specified by the first timing guideline; determining that the first temporal edge lies inside the first zone; and determining that the first temporal edge is not coincident with either the first shot change, the start of the first zone, or the end of the first zone.

13. The computer-readable storage medium of any of clauses 10-12, wherein performing the one or more additional operations to select the second temporal edge comprises computing a first distance between the first temporal edge and the start of the first zone; computing a second distance between the first temporal edge and the end of the first zone; computing a third distance between the first temporal edge and the first shot change; and if the first distance is smaller than the second distance and the first distance is smaller than the third distance, then setting the second temporal edge equal to the start of the first zone; or if the second distance is smaller than the third distance, then setting the second temporal edge equal to the end of the first zone; or setting the second temporal edge equal to the first shot change.

14. The computer-readable storage medium of any of clauses 10-13, wherein causing the temporal location of the first subtitle within the sequence of frames to be modified comprises computing a timing error based on the first temporal edge and the second temporal edge; and generating a graphical user interface depicting the first subtitle, the first shot change, the first temporal edge, and the timing error.

15. The computer-readable storage medium of any of clauses 10-14, wherein causing the temporal location of the first subtitle within the sequence of frames to be modified comprises computing a timing error based on the first temporal edge and the second temporal edge; and generating a graphical user interface depicting the first subtitle, the first shot change, the first temporal edge, and the timing error.

16. The computer-readable storage medium of any of clauses 10-15, wherein causing the temporal location of the first subtitle within the sequence of frames to be modified comprises computing a timing error based on the first temporal edge and the second temporal edge; and displaying at least a portion of a video component of the audiovisual program, and one or more timelines depicting the first subtitle, the first shot change, the timing error, and at least a portion of an audio component of the audiovisual program.

17. The computer-readable storage medium of any of clauses 10-16, wherein the timing guideline specifies at least one of a minimum frame gap and a minimum time gap between a shot change and the start of a subtitle when the start of the subtitle is not coincident with the shot change.

18. The computer-readable storage medium of any of clauses 10-17, further comprising determining that a number of frames between the first subtitle and a second subtitle is less than a minimum subtitle gap; and generating an error message specifying that the number of frames between the first subtitle and the second subtitle is less than the minimum subtitle gap.

19. In some embodiments, a system comprises a memory storing a subtitle timing application; and a processor that is coupled to the memory, wherein, when executed by the processor, the subtitle timing application causes the processor to perform one or more operations to determine that the start of a first subtitle does not satisfy a timing guideline relative to a first shot change that occurs within a sequence of frames of an audiovisual program; perform one or more additional operations to select a temporal edge that satisfies the timing guideline relative to the first shot change; and cause the start of the first subtitle within the sequence of frames to be modified based on the temporal edge.

20. The system of clause 19, wherein the timing guideline specifies at least one of a minimum frame gap and a minimum time gap between a shot change and the start of a subtitle when the start of the subtitle is not coincident with the shot change.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   determining that a first subtitle is positioned at a first temporal location within a sequence of frames of an audiovisual program, wherein:
      a first shot change occurs at a second temporal location within the sequence of frames, and
      the first subtitle has a first temporal edge coincident with the first temporal location;
   determining that the first temporal edge does not satisfy a timing guideline relative to the first shot change;
   computing a plurality of timing errors associated with the first subtitle, wherein each timing error in the plurality of timing errors indicates a distance between:
      a different location within the sequence of frames relative to the shot change, and
      the first temporal location;
   determining, based on a difference between at least a subset of the plurality of timing errors, a second temporal edge for the first subtitle that satisfies the timing guideline relative to the first shot change; and
   causing, via a processor and based on the second temporal edge, the first subtitle to be positioned at a third temporal location within the sequence of frames.

2. The computer-implemented method of claim 1, wherein the first temporal edge comprises either a start of the first subtitle or an end of the first subtitle.

3. The computer-implemented method of claim 1, wherein determining that the first temporal edge does not satisfy the timing guideline comprises:
   generating based on a frame included in the sequence of frames, a first zone that is associated with (i) the first shot change, and (ii) a minimum gap specified by a first timing guideline;
   determining that the first temporal edge lies inside the first zone; and
   determining that the first temporal edge is not coincident with one of (i) the first shot change, (ii) a start of the first zone, or (iii) an end of the first zone.

4. The computer-implemented method of claim 3, wherein:
   computing the plurality of timing errors comprises:
      computing a first distance between the first temporal edge and the start of the first zone;
      computing a second distance between the first temporal edge and the end of the first zone;
      computing a third distance between the first temporal edge and the first shot change; and
   determining the second temporal edge comprises:
      if the first distance is smaller than the second distance and the first distance is smaller than the third distance, then setting the second temporal edge equal to the start of the first zone; or
      if the second distance is smaller than the third distance, then setting the second temporal edge equal to the end of the first zone; or
      setting the second temporal edge equal to the first shot change.

5. The computer-implemented method of claim 1, further comprising generating a graphical user interface that depicts the first shot change, the first subtitle, and the second temporal edge.

6. The computer-implemented method of claim 1, further comprising generating an error message that specifies the first subtitle and at least one timing error included in the plurality of timing errors.

7. The computer-implemented method of claim 1, wherein the timing guideline specifies at least one of:
   a minimum frame gap; or
   when a start of the subtitle is not coincident with a shot change, a minimum time gap between the shot change and the start of a subtitle.

8. The computer-implemented method of claim 1, further comprising identifying one or more shot changes that include the first shot change.

9. The computer-implemented method of claim 1, further comprising:
   computing, based on a frame rate, a reading speed associated with the first subtitle;
   determining that the reading speed associated with the first subtitle exceeds a maximum reading speed; and
   generating an error message specifying the first subtitle and the reading speed.

10. One or more non-transitory computer-readable storage media including instructions that, when executed by one or more processors, cause the one or more processors to perform the steps of:

acquiring a plurality of shot changes and a first subtitle associated with an audiovisual program, wherein the plurality of shot changes and the first subtitle are included within a sequence of frames of the audiovisual program;

determining that the first subtitle is positioned at a first temporal location within the sequence of frames, wherein:
- a first shot change occurs at a second temporal location within the sequence of frames, and
- the first subtitle has a first temporal edge coincident with the first temporal location;

computing a plurality of timing errors associated with the first subtitle, wherein each timing error in the plurality of timing errors indicates a distance between:
- a different location within the sequence of frames relative to the shot change, and
- the first temporal location;

determining that a first temporal edge does not satisfy a timing guideline relative to the first shot change that is included in the plurality of shot changes;

determining, based on a difference between at least a subset of the plurality of timing errors, a second temporal edge for the first subtitle that satisfies the timing guideline relative to the first shot change; and causing, based on the second temporal edge, the first subtitle to be positioned at a third temporal location within the sequence of frames.

11. The one or more non-transitory computer-readable storage media of claim 10, wherein the first temporal edge comprises either a start of the first subtitle or an end of the first subtitle.

12. The one or more non-transitory computer-readable storage media of claim 10, determining that the first temporal edge does not satisfy the timing guideline comprises:
generating, based on a frame included in the sequence of frames, a first zone that is associated with (i) the first shot change, and (ii) a minimum gap specified by the first timing guideline;
determining that the first temporal edge lies inside the first zone; and
determining that the first temporal edge is not coincident with one of (i) the first shot change, (ii) start of the first zone, or (iii) an end of the first zone.

13. The one or more non-transitory computer-readable storage media of claim 12, wherein:
computing the plurality of timing error comprises:
computing a first distance between the first temporal edge and the start of the first zone;
computing a second distance between the first temporal edge and the end of the first zone;
computing a third distance between the first temporal edge and the first shot change; and
determining the second temporal edge comprises:
if the first distance is smaller than the second distance and the first distance is smaller than the third distance, then setting the second temporal edge equal to the start of the first zone; or
if the second distance is smaller than the third distance, then setting the second temporal edge equal to the end of the first zone; or
setting the second temporal edge equal to the first shot change.

14. The one or more non-transitory computer-readable storage media of claim 10, further including instructions that, when executed by the one or more processors, cause the one or more processors to further perform the step of generating a graphical user interface depicting at least one of the first subtitle, the first shot change, or at least one timing error included in the plurality of timing errors.

15. The one or more non-transitory computer-readable storage media of claim 10, further including instructions that, when executed by the one or more processors, cause the one or more processors to further perform the step of generating a graphical user interface depicting the first subtitle, the first shot change, the first temporal edge, and at least one timing error included in the plurality of timing errors.

16. The one or more non-transitory computer-readable storage media of claim 10, further including instructions that, when executed by the one or more processors, cause the one or more processors to further perform the steps of:
displaying at least a portion of a video component of the audiovisual program, and
displaying one or more timelines depicting: (i) the first subtitle, (ii) the first shot change, (iii) at least one timing error included in the plurality of timing errors, and (iv) at least a portion of an audio component of the audiovisual program.

17. The one or more non-transitory computer-readable storage media of claim 10, wherein the timing guideline specifies at least one of:
a minimum frame gap; or
when a start of the subtitle is not coincident with a shot change, a minimum time gap between the shot change and the start of a subtitle.

18. The one or more non-transitory computer-readable storage media of claim 10, further including instructions that, when executed by one or more processors, cause the one or more processors to perform the steps of:
determining that a number of frames between the first subtitle and a second subtitle is less than a minimum subtitle gap; and
generating an error message specifying that the number of frames between the first subtitle and the second subtitle is less than the minimum subtitle gap.

19. A system, comprising:
a memory storing a subtitle timing application; and
a processor that is coupled to the memory, wherein, when executed by the processor, the subtitle timing application causes the processor to:
determine that a first subtitle is positioned at a first temporal location within a sequence of frames of an audiovisual program, wherein:
a first shot change occurs at a second temporal location within the sequence of frames, and
the first subtitle has a first temporal edge coincident with the first temporal location;
determine that the first temporal edge does not satisfy a timing guideline relative to the first shot change;
compute a plurality of timing errors associated with the first subtitle, wherein each timing error in the plurality if timing errors indicates a distance between:
a different location within the sequence of frames relative to a shot change, and
the first temporal location,
determine, based on a difference between at least a subset of the plurality of timing errors, a second temporal edge for the first subtitle that satisfies the timing guideline relative to the first shot change; and
cause, based on the second temporal edge, the first subtitle to be positioned at a third temporal location within the sequence of frames.

20. The system of claim 19, wherein the timing guideline specifies at least one of:
  a minimum frame gap; or
  a minimum time gap between a shot change and the start of a subtitle when the start of the subtitle is not coincident with the shot change.

\* \* \* \* \*